Dec. 26, 1922.
A. HUETTER.
EXPANSIBLE CORE.
FILED MAR. 8, 1921.
1,439,895.
3 SHEETS—SHEET 1.
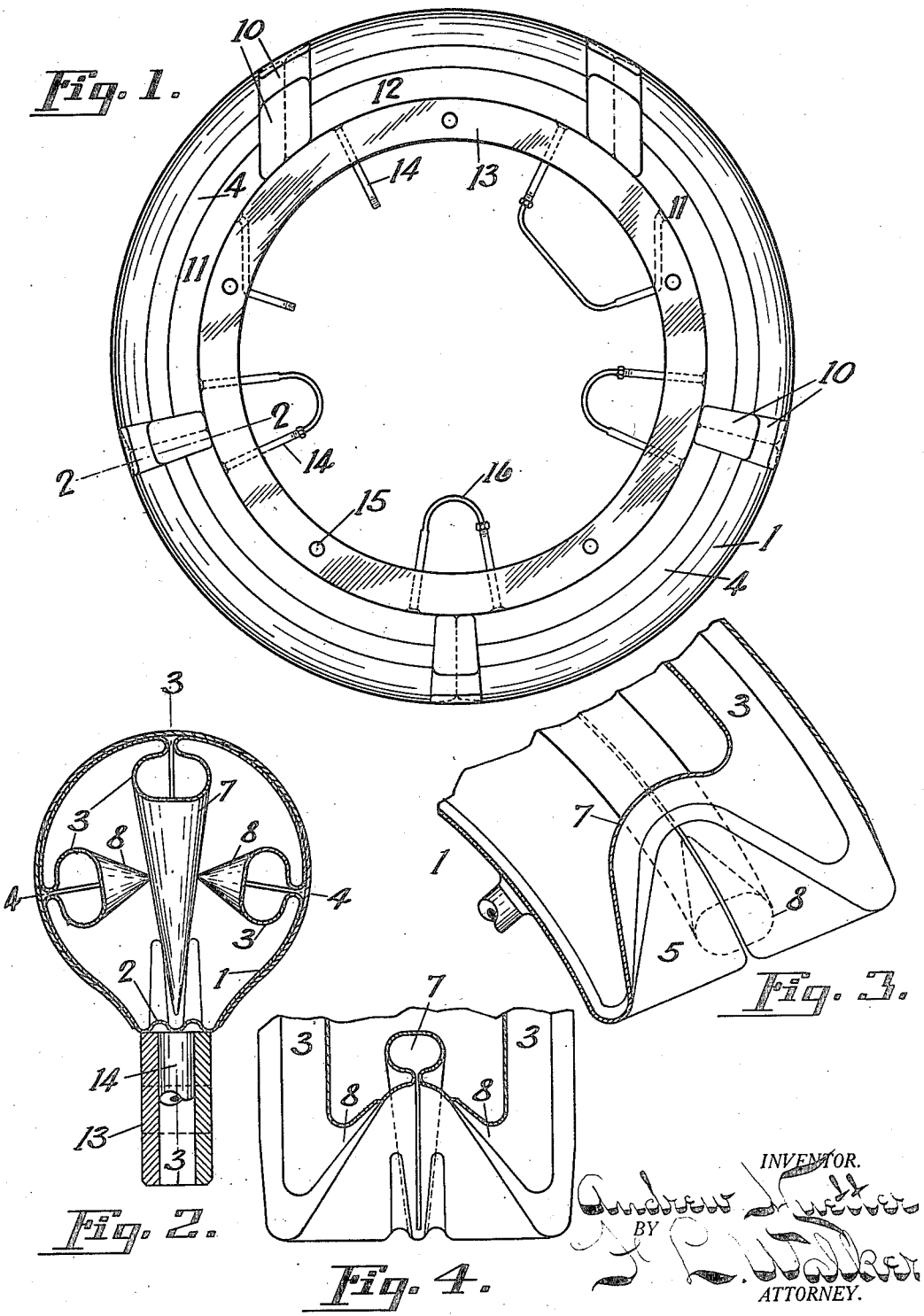

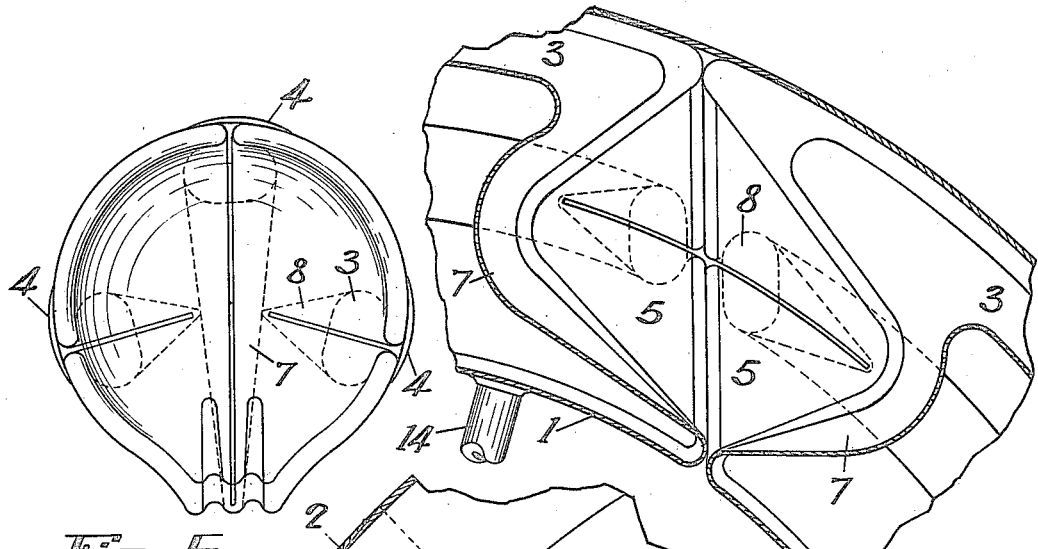
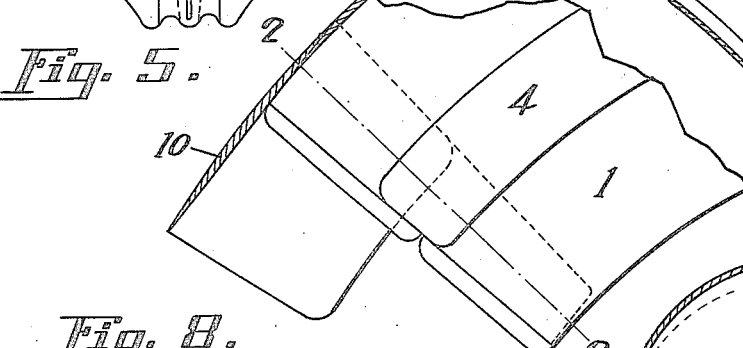
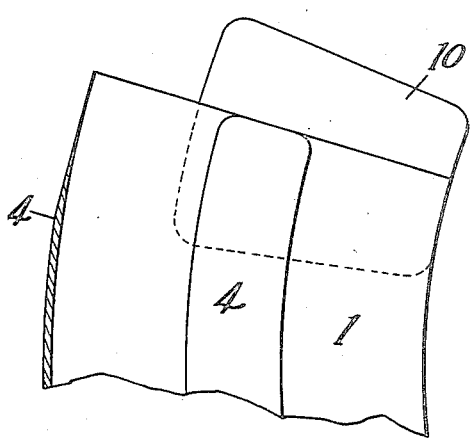
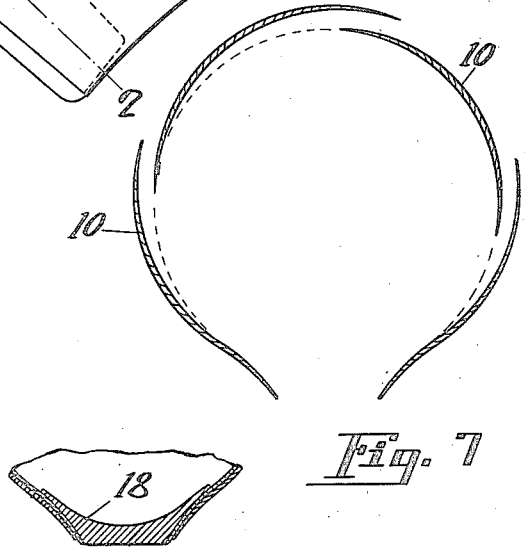

Dec. 26, 1922.
A. HUETTER.
EXPANSIBLE CORE.
FILED MAR. 8, 1921.
1,439,895.
3 SHEETS—SHEET 3.
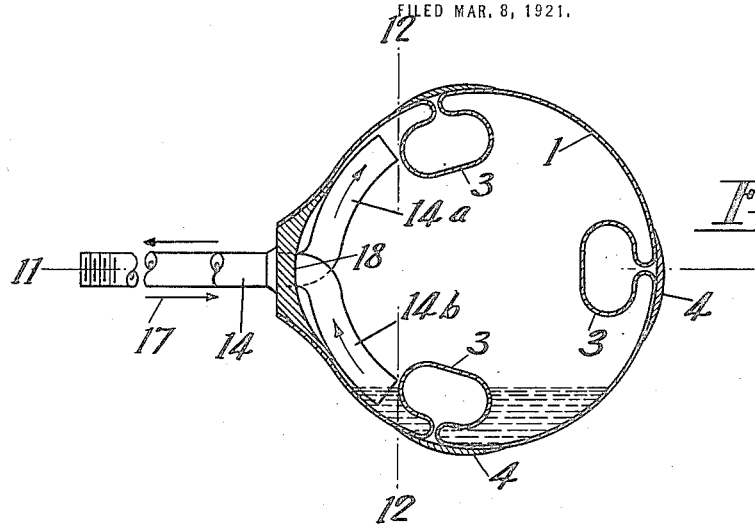
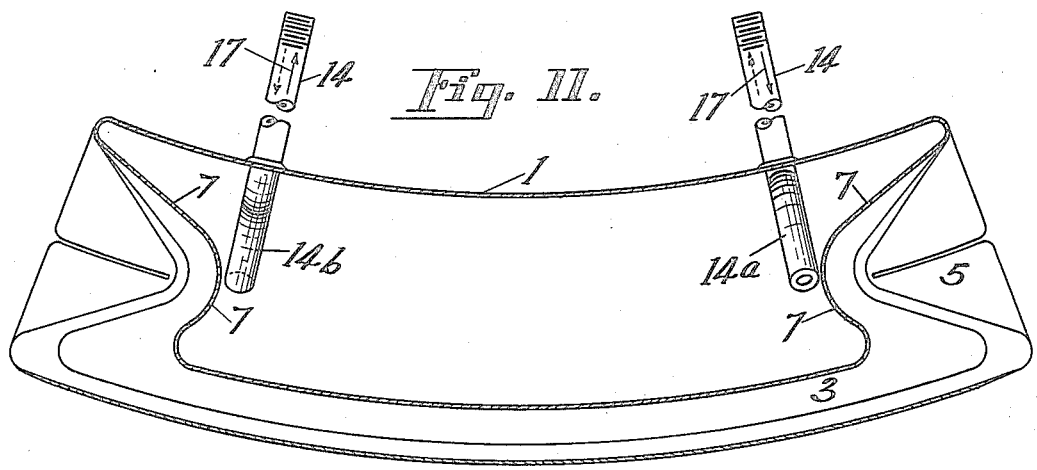
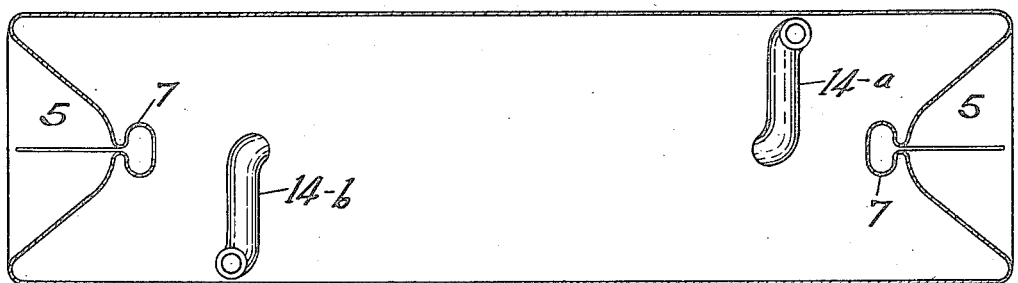

Patented Dec. 26, 1922.

1,439,895

UNITED STATES PATENT OFFICE.

ANDREW HUETTER, OF DAYTON, OHIO, ASSIGNOR TO THE ALLSTEEL RIDEWELL TIRE AND RUBBER COMPANY, OF DAYTON, OHIO, A CORPORATION OF OHIO.

EXPANSIBLE CORE.

Application filed March 8, 1921. Serial No. 450,590.

*To all whom it may concern:*

Be it known that I, ANDREW HUETTER, formerly a subject of the former Emperor of Austria, residing at Dayton, in the county of Montgomery and State of Ohio, have invented certain new and useful Improvements in Expansible Cores, of which the following is a specification.

This invention relates to molds for plastic material, and more particularly to an expansible core for air bags for use in the manufacture and repair of pneumatic tires for vehicles.

The object of the invention is to simplify the structure as well as the means and mode of operation of such expansible cores, whereby they will not only be cheapened in construction, but will be more efficient in use, positive in operation, uniform in action, of increased durability and unlikely to get out of repair.

A further object of the invention is to provide a continuous or annular hollow expansible core, divided into separable sections, with means for supplying fluid under pressure uniformly to the several sections to effect the uniform expansion thereof.

A further object of the invention is to provide improved means for interconnecting the several separable sections, one with the other to afford a substantially uniform exterior surface, yet readily permitting the expansion of the several sections.

A further primary object of the invention is to provide improved form of flexible expanding head of the several tire sections, which will automatically compensate for the expansion of such sections. Heretofore elastic air bags made of fabric or of rubber, or of these materials in combination have been used particularly during the curing operation of the so-called "cord tire." In such instances the tire is built upon a rigid or flexible core and the expansible air bag is subsequently substituted therefor. The life or period of practical use of such elastic or expansible air bag has been quite short due to their deterioration under the heat of repeated vulcanizing operation. Under the action of heat they soon loose their elasticity and become hardened and set in form and therefore useless. One of the primary objects of this invention is to provide an improved form of expansible core, made from flexible but nonelastic material, preferably though not necessarily sheet metal, which will readily withstand high vulcanizing temperatures, and which is capable of uniform distention by means of the internal fluid pressure, such as steam, compressed air, water or other pressure means. In the present instance the core comprises a series of arcuate sections which conjointly form a complete or continuous annulus. These sections are capable of use simultaneously or separately for repair purposes. When used conjointly yielding or expansible interconnecting means is provided between the several sections.

With the above primary and other incidental objects in view as will more fully appear in the specification the invention consists in the features of construction the parts and combinations thereof, and the mode of operation or their equivalents as hereinafter described and set forth in the claims.

In the accompanying drawings, wherein is shown the preferred but not necessarily the only embodiment of the present invention, Fig. 1 is a side elevation of the assembled expansible core, upon which the vehicle tire is built and later stretched during the vulcanizing operation. Fig. 2 is a transverse sectional view thru one of the core sections, substantially on line 2—2 of Fig. 1. Fig. 3 is a longitudinal sectional view on line 3—3 of Fig. 2. Fig. 4 is a longitudinal sectional view on line 4—4 of Fig. 2. Fig. 5 is an end elevation of one of the sectional cores, showing the closure head therefor. Fig 6 is a detail sectional view similar to Fig. 3 of the end of the key section and that of the adjoining section. Fig. 7 is a detail view of the overlapping interconnecting or coupling plates removed from their supporting sections. Fig. 8 is a detail side elevation of the adjacent ends of two succeeding units or segmental sections, showing the relation of the overlapping leaves or plates hereafter mentioned, part of which are carried by one unit and the remainder by the other unit. Fig. 9 is a detail sectional view of a modification embodying a reinforcement upon the inner side of the core unit, in lieu of the corrugations shown in the preceding figure. Fig. 10 is a transverse sectional view of the unit or core section and Figs. 11 and 12 longitudinal sectional views thereof on lines 11—11 and 12—12 of Fig. 10, illustrating the interior arrangement and relation of the inlet and outlet conduit adapted for the use of steam as the expanding medium, whereby the water of condensation is discharged from the unit or core section in advance of the steam.

Like parts are indicated by similar characters of reference thruout the several views.

In the present instance there has been shown for illustrative purposes, an expanding tire core section, the expanding shell of which agrees in construction substantially with that disclosed in my co-pending application, Serial No. 374,982, filed April 19, 1920, Patent 1,368,631, Feb. 15, 1921. Such section comprises an arcuate tubular shell 1, preferably provided in its inner circumference with a series of longitudinal corrugations 2, and having located in its peripheral and side walls, longitudinally disposed re-entrant flexible expanding plaits, or folds 3. The cross sectional contour of this unit conforms approximately to the interior outline of the tire casing to be produced. The segmental unit is formed from flexible but inextensible material, preferably though not necessarily of sheet metal, but which in lieu thereof may be frictioned canvas or rubberized canvas, fiber, composition, hard rubber or other material possessing the necessary characteristics. While only three of the re-entrant loops or plaits have been shown, it will be understood that there may be more or less of these yielding joints or folds, according to the size of the tire and character of work to be performed. These re-entrant loops or plaits afford in the exterior walls of the unit a series of longitudinally disposed narrow entrance slots leading to such folds or loops. To prevent the material of the tire being forced or crowded into such slots or spaces, opened up by the expansion of the unit, and consequent distention of the re-entrant loop or plait, there is provided a flap or shield 4 for each loop or plait, which flap or shield is attached adjacent to one marginal edge to the wall of the unit, the opposite free edge of which extends across the slot or opening leading to such plait or loop and bears loosely upon the wall of the core unit. This free edge of the shield flap 4 is preferably reduced to a feather edge, whereby it will easily merge into the outline of the core unit.

This construction is fully and clearly disclosed in my co-pending application before referred to, to which reference is to be had for details of construction.

In the present instance, the ends of these segmental arcuate core units are provided with closure heads somewhat different from that shown and described in my prior application. In the present instance, the closure heads 5 are of inturned or indented concave form, with reverse marginal flanges 6, which are united with the walls of the tubular shell 1. The head 5, which is approximately conical in form has formed therein a series of re-entrant or inturned folds or plaits 7 and 8, which register with and form continuations of the folds or plaits 3 of the tubular shell. The plaits or folds of the closure head are tapered. The fold or plait 7 which registers with and forms a continuation of the peripheral plait or fold of the tubular section extends inwardly over the apex of the conoidal head 5, terminating on the opposite side of the head, adjacent to the corrugated inner circumference 2. The inturned tapered folds or plaits 8 of the conoidal head 5 are radially disposed and register with the lateral plait 3 of the tubular shell of which they form continuations. These tapered radially disposed plaits 8 terminate in proximity to the apex of the conoidal head 5. Such plaits or folds, extend not only thru the conoidal or concave portion of the head, but also thru the reverse marginal flange 6, whereby the plaited contour of the flange 6 agrees with that of a tubular unit 1. The inner circumferential corrugations 2 of the unit 1 are continued at the marginal flange 6 of the concave head, and thence within the concavity of the head tapering until they vanish. The re-entrant folds or plaits upon the inner side of the conoidal head 5 afford radially disposed slots which divide the head into quadrants or sectors. The slot or opening leading to the plait or fold 7 which as before described is extended across the apex of the conoidal head to the opposite side, extends diametrically thru the head, while the slots or openings pertaining to the folds or plaits 8 extend radially at right angles thereto. Such construction is fully disclosed in Fig. 5. Upon the application of internal pressure the head will expand in unison with the bodily expansion of the tubular shell. Such internal pressure tends to flatten or crush outwardly the conoidal head 5, at the same time opening up the plaits or folds 7 and 8, effecting a relative separation of the sectors or quadrants defined by the radially disposed slots or openings leading to such plaits or folds. The expansion of the closure head is thus uniform with that of the body of the unit, and the expansive force or pressure upon the tire is equalized thruout the length of the unit.

Whereas heretofore tires have been usually built over a solid or non-expansible core, from which they are removed and an inflatable air bag placed therein to afford the required expansive pressure, in the present instance, the tire is built over the expanding core, which is subsequently employed as an air bag. To this end the complete core comprises a series or succession of arcuate segmental units as before described, arranged end to end to form a continuous annulus. In order to provide lap joints between the successive core units to prevent the compression or crowding of the tire material between the units, overlapping interconnecting sockets are provided on each unit, within which the end of the succeeding unit is seated. These overlapping interconnecting portions comprise a succession of overlapping leaves or plates 10, each secured at one end to the supporting unit, with its free end overlapping and conforming to the next succeeding leaf. These overlapping leaves are attached to the units adjacent to the ends thereof, in such relation as to project somewhat beyond the extremity of the hollow segmental unit, whereby they form an expansible socket, the plates or leaves of which freely overlap each other somewhat in fish scale relation, whereby each plate is free to move relative into the adjacent leaves, in unison with the expansion of the supporting member. The free ends of the overlapping leaves or plate are preferably reduced to feather edge, whereby the uniform contour of the unit is maintained. These overlapping leaves or scales may all be secured to and carried by a single core unit, overlapping the adjacent end of the succeeding unit, which in such case would be devoid of such leaves, or a part of the overlapping leaves may be carried by each of the abutting unit. The latter arrangement is essentially the case in the matter of the key unit 11. In order to withdraw the several sections from the completed tire, it is necessary that some one of the units have parallel ends, whereby the unit may be drawn inward, from between the units on either side. Such a construction is shown at the top of Fig. 1, and in the detail view Fig. 7. In this instance the overlapping leaves forming the joints or interconnections between succeeding sections about the inner portion of the core are carried by the key member 12, while those arranged about the peripheral face of the core are carried by the adjacent sections on either side of the key member 12. This allows the key member 12 with its connected overlapping leaves to be drawn freely away from the neighboring section. Thus half of the socket formed by such overlapping leaves is carried by one of the members, and the other half by the adjacent member.

During the operation of building the tire about the core, the core sectons must be held firmly and immovably in relation one with the other. To this end the separable core units are detachably mounted upon a rigid internal supporting ring, 13. This ring is formed in two halves, which are arranged side by side. The respective halves of the ring which is divided peripherally, are provided with registering grooves to receive the inflation stems or conduits 14, which project inwardly from the unit 1. There are two of these inflation stems or conduits 14 provided for each unit. The halves of the supporting ring 13 extending on opposite sides of the inflation stems or conduits 14 are bolted together by bolts 15, to securely clamp the inflation stems 14 and so hold the units in their adjusted relation. The inflation stems or conduits 14 of successive core units are detachably interconnected one with another by intermediate U-shaped conduit sections 16, whereby the core units communicate one with another thruout a continuous succession. By admitting air or other fluid under pressure to the first unit of the series, the pressure fluid will circulate thence thru each of the succeeding units to the final unit of the series. By this means the pressure within each unit of the series is equalized. Moreover, it enables the use of live steam, not only as an expanding or pressure agent, but for vulcanizing purposes. Such supply of live steam being admitted thru the stem or conduit 14, circulates thru the successive units, each of the units being supplied in turn with steam by which the tire is heat treated and the expansion of the several units is effected uniformly.

The use of live steam as the expanding medium and for the simultaneous heat treatment or vulcanization of the rubber is quite desirable. However, if steam is to be used for this purpose, means must be provided for carrying out the water of condensation, which will form within the segmental unit. To this end, when adapting the expanding core to the use of live steam, the inflation conduits or stems 14 are extended within the hollow interior of the core unit, the inward extensions of such stems or conduits of which there are two being turned in opposite direction as shown at $14^a$ and $14^b$, Figs. 10, 11 and 12. The inflation stem or conduit having the upturned inward extending branch or deflection is employed as the inlet stem or conduit, while that having the downward extending deflection within the unit is employed as the outlet conduit, leading from such unit to the next succeeding unit, or discharging thru a return line to the steam boiler or generator as the case may be. By such arrangement, the incoming charge of live steam is admitted in the upper portion of the hollow core or unit, above the fluid level of the water of condensation which may collect in the bottom thereof. The steam pressure upon the surface of such body of condensation will force the water of condensation thru the outlet passage.

That is to say, the condensed water within the chamber when it is sufficient to submerge the lower end of the outlet conduit or downturned arm 14$^b$, will be displaced by the incoming charge of steam under pressure admitted thru the upturned conduit branch 14$^a$. Inasmuch as the tire maker may not always lay the tire with the core in the matrix or mold with the same side upward, it will be obvious that upon such reversal, the conduit branch or arm 14$^b$ will be the upturned extension, while the branch 14$^a$ will be downturned. Therefore, upon reversal of the position of the core, the inlet and exhaust connections will be also transposed. To this end the outward projecting stems 14 are preferably though not necessarily each provided on its opposite side with reversely disposed arrows or darts as at 17. By this arrangement, when the core is so positioned that the inward extension thereof is down-turned, the outwardly disposed dart or arrow 17 will be in view upon the upper side of the stem connection 14. While if the core is reversed so that the inner extension is upturned as at 14$^a$, then the indicating arrow or dart 17 appearing upon the stem 14 will be inwardly directed. These indications 17 will guide the operator in making his steam connection for controlling the course of the steam charge.

Inasmuch as the character of the finished product depends to a considerable degree upon the vulcanizing temperature as well as upon the pressure, it is desirable that both the pressure and temperature be controlled. If live steam alone is used as an expanding medium and a very high degree of pressure is desired, the heat resulting from the use of sufficient steam to obtain the desired high pressure, may be so great as to injure the product by overheating.

To overcome the difficulty of excessive heat when excessive pressure is to be obtained, steam and compressed air are admitted together into the expanding unit. These may be intermixed before inflation, but a convenient and simple method is to provide a branch connection to the inlet stem 14 thru one branch of which steam is admitted to afford the desired degree of temperature and partially expand the core while a charge of air is admitted thru the other branch to augment the steam pressure thereby increasing the pressure within the unit and further expanding the same without necessarily increasing the temperature. As before mentioned, however, the steam and air may be intermixed in their proper proportion to afford the desired temperature as well as pressure before admission to the expanding unit, or the charge of air may be first admitted and the air pressure augmented by the charge of steam by which the desired temperature is afforded.

In Fig. 9 and also Fig. 10, the inner circumference of the core has been shown reinforced by a wall 18 of increased thickness, in lieu of the corrugations shown in the preceding figure. This reinforced wall is non-expanding whereas the corrugated inner wall shown in Figs. 2 and 5 is capable of a slight lateral expansion. Thus in the latter instance, the beads or rim flanges of the tire are subjected to the expanding pressure of the core unit, whereas in the reinforced construction of Fig. 9, such parts of the tire are not subjected to expanding pressure, but are molded at predetermined uniform proportion and size.

In utilizing a single section of the core for repair work in conjunction with standard equipment and the usual matrices it is desirable to locate the inlet and outlet stems 14 in the ends or heads of the section in such relation as to miss the inturned plaits 7 and 8, the outlet stem being extended downward to discharge water of condensation as before described.

From the above description it will be apparent that there is thus provided a device of the character described possessing the particular features of advantage before enumerated as desirable, but which obviously is susceptible of modification in its form, proportions detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A core for tires comprising a hollow annulus of flexible material, the annulus being expansible under the influence of internal fluid pressure, means for supplying fluid under pressure thereto and an inflexible support therefor detachably connected therewith.

2. A core for tires comprising a hollow annulus separable into a plurality of independent sections each expansible under the influence of internal fluid pressure, an inflexible support common to all the sections with which the sections are detachably connected, and means for supplying fluid under pressure to the several sections.

3. A core for tires comprising an annulus divided into a plurality of separable sections, and separate arcuate overlapping plates attached to the end of one section overlapping the end of the succeeding section.

4. A core for tires comprising a plurality of separable expansible sections and a series of relatively movable leaves arranged in overlapping relation one upon another and overlapping the adjacent ends of succeeding sections.

5. A core for tires including a plurality of arcuate hollow expansible sections, and expansible socket means carried by one section into which the end of the succeeding section extends.

6. A core for tires including a plurality of arcuate hollow expansible sections, of a plurality of overlapping leaves carried by one section and overhanging the adjacent end of the succeeding section.

7. A core for tires including a plurality of arcuate separable expansible sections and a plurality of overlapping leaves having their inner or overlapped portions attached to one of the sections with their exterior or free portions contacting the succeeding leaf whereby said leaves may yield one upon another to compensate for the expansion and contraction of the supporting section, said overlapping leaves extending beyond the end of the supporting section and overhanging the succeeding section of the plurality.

8. A sectional core for tires comprising a plurality of independent separable sections, expansible under the influence of internal pressure, and detachable intercommunicating conduits connecting different sections whereby fluid under pressure may be circulated from one to another of said sections.

9. An expansible core for tires divided into a plurality of separable sections, and intercommunicating passages whereby the separable sections are connected in a succession for the admission of fluid under pressure to uniformly expand each of the sections.

10. A sectional core for tires comprising a plurality of independent separable expansion sections, and means for simultaneously subjecting the plurality of sections to equalized internal fluid pressure.

11. An expansible core for tires comprising a plurality of compartments for fluid under pressure, and means for supplying the expanding fluid to the several compartments at substantially equalized pressures.

12. An expansible core for tires comprising a succession of compartments for fluid under pressure and intercommunicating passages between succeeding compartments, whereby fluid under pressure may be circulated successively from one compartment to another.

13. An expansible core for tires comprising a plurality of independent separable sections expansible under the influence of internal pressure, means for supplying fluid under pressure, thereto, and a continuous annular mounting ring to which the several sections are detachably connected.

14. An annular expansible core of flexible material expansible under the influence of fluid under pressure, and an inflexible support ring connected to the annular expansible body upon the inner periphery thereof.

15. A core for tires including a plurality of arcuate separable expansible sections, a terminal flange extending beyond one of the sections and overhanging the adjacent section, and a terminal flange upon the last mentioned section offset in relation with the terminal flange of the first mentioned section, overhanging the first mentioned section whereby said flanged end sections are separable laterally.

16. The combination with an expansible hollow core for tires operable by internal fluid pressure, of an expansible head therefor comprising a concave closure of flexible sheet material having therein a plurality of tapered plaits extending substantially from the base to the apex of said tapered closure.

17. In an expansible core for tires, the combination with a tubular shell of flexible but non-elastic material of inturned concave closure heads therefor also of flexible non-elastic material and expansion plaits therein.

18. In an expansible core for tires, the combination with a tubular shell of flexible but non-elastic material, of a radially expansible terminal closure for said tubular shell.

19. In an expansible core for tires, the combination with a tubular shell of flexible but non-elastic material, of a closure head therefor, of flexible non-elastic material, said head having an expansible joint therein.

20. In an expansible core for tires, the combination with a tubular shell of flexible but non-elastic material, of a closure head therefor comprising a plurality of sections inter-connected by flexible expansion joints.

21. In an expansible core for tires, the combination with a tubular shell of flexible but non-elastic material, of a closure head therefor having therein a plurality of radially disposed expansive formations.

22. In an expansible core for tires, the combination with a tubular shell of flexible but non-elastic material, of a closure head therefor, of flexible material having therein a plurality of radially disposed plaits.

23. In an expansible core for tires, the combination with a tubular shell of flexible but non-elastic material, of a closure head therefor, comprising an inturned conical body, the margin of which is joined to said shell, said closure head having therein a plurality of radially disposed yielding gores.

24. In an expansible core for tires, the combination with a tubular shell of flexible but non-elastic material, said tubular shell having therein a longitudinally disposed reentrant expansible fold, of an inturned concave closure head therefor having therein a continuation of said reentrant expansible fold radially disposed in said head.

25. In an expansible core for tires, the combination with a tubular shell of flexible but non-elastic material, said tube having a plurality of longitudinally disposed reentrant expansible folds, of a closure head therefor, having therein a plurality of tapered reentrant expansible folds registering with and forming continuations of the expansible folds of said shell.

26. In an expansible core for tires, the combination with a tubular shell of flexible but non-elastic material, said shell having therein longitudinally disposed reentrant expansive plaits, and a concave head for said shell having therein like plaits registering with those of the shell.

27. In an expansible core for tires, the combination with a tubular shell of flexible but non-elastic material, closure heads in said shell and longitudinally disposed reentrant expansible plaits extending throughout the walls of the shell and through said heads.

28. In a tire core, a hollow shell within which steam is to be circulated, steam inlet and outlet conduits projecting within the shell, the inward projecting extensions of such conduits being deflected in opposite directions within said shell.

29. In a tire core, a hollow shell, two conduits projecting in different directions within the shell, and means upon the exterior of the shell to indicate the direction of the enclosed conduit projections.

30. In an expansible core, an expansible tubular shell, and expansible heads therefor of flexible material, and radially disposed plaits therein.

31. In an expansible core, an expansible tubular shell, and expansible heads therefor, of flexible material and reentrant expansible folds in said heads.

32. In an expansible core, an expansible tubular shell, and expansible heads therefor, of flexible material, and transversely arranged expansion joints in said heads.

33. In an expansible core, an expansible tubular shell, and expansible heads therefor of flexible material and transverse folds in said heads yielding under internal pressure to permit the expansion of the heads.

34. In an expansible core, an expansible tubular shell, and expansible heads therefor of flexible material, and radially disposed tapered plaits in said heads.

35. In an expansible core, an expansible tubular shell of flexible but inextensible material, and expansible heads for said shell.

36. In an expansible core, a plurality of expansible sections arranged end to end and an expansible coupling means overlapping the ends of adjacent sections.

37. In an expansible core, a plurality of expansible sections arranged end to end and overlapping tongues carried by each section overlapping the adjacent end of the succeeding section.

38. In an expansible core, a plurality of expansible sections arranged end to end and a plurality of overlapping plates carried by one of the sections and overlapping the other section, said plates being relatively movable to compensate for the expansion and contraction of the sections.

39. In an expansible core, a plurality of expansible sections arranged end to end and coupling means including separate plates carried by each section and overlapping the adjacent end of the succeeding section and further overlapping the plate carried by said succeeding section.

40. In an expansible core, a plurality of expansible sections arranged end to end and coupling means including a series of relatively movable overlapping plates, enclosing the adjacent ends of the sections and by their relative movement compensating for expansion and contraction of the sections.

In testimony whereof, I have hereunto set my hand this 2nd day of March A. D. 1921.

ANDREW HUETTER.

Witnesses:
HARRY F. NOLAN,
GEORGE C. HELWIG.